United States Patent [19]

Chartier

[11] Patent Number: 4,576,533

[45] Date of Patent: Mar. 18, 1986

[54] ATTACHMENT CAP FOR FASTENER HEAD

[75] Inventor: George R. Chartier, Laval, Canada

[73] Assignee: O. J. Ouellette Inc., Quebec, Canada

[21] Appl. No.: 624,364

[22] Filed: Jun. 25, 1984

[51] Int. Cl.⁴ .................. F16B 19/00; F16B 33/00
[52] U.S. Cl. .................... 411/373; 411/431; 10/86 C
[58] Field of Search ............... 411/373, 377, 429–431, 411/908, 910; 10/86 C

[56] References Cited

U.S. PATENT DOCUMENTS

| | | | |
|---|---|---|---|
| 3,134,290 | 5/1964 | Jentoft | 411/377 |
| 3,471,158 | 10/1969 | Solins | 411/431 |
| 3,618,444 | 11/1971 | Kay et al. | 411/373 |
| 4,373,842 | 2/1983 | Bettini et al. | 411/377 |

FOREIGN PATENT DOCUMENTS

| | | | |
|---|---|---|---|
| 933050 | 7/1963 | United Kingdom | 411/431 |
| 2058267 | 4/1981 | United Kingdom | 411/429 |

Primary Examiner—Kenneth J. Dorner
Assistant Examiner—Neill Wilson
Attorney, Agent, or Firm—Oblon, Fisher, Spivak, McClelland & Maier

[57] ABSTRACT

A cap of synthetic resinous material for securement over the head of a fastener, such as a bolt or screw type. The cap has a hollow head portion and a cap attachment portion. The head portion has a top wall and an integral annular side wall. The attachment portion is formed integral in the inner wall adjacent a circumferential free edge thereof and is constituted by an annular channel formed in the inner wall of the cap for receiving in snap-fit engagement therein a lower circumferential flange of a fastener head to secure the cap over the fastener head.

5 Claims, 3 Drawing Figures

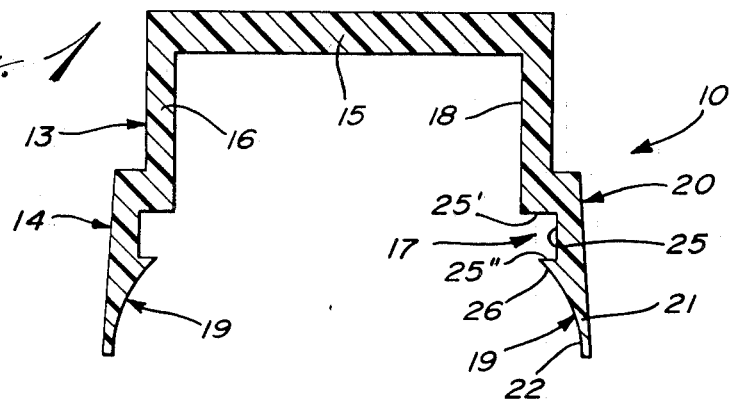
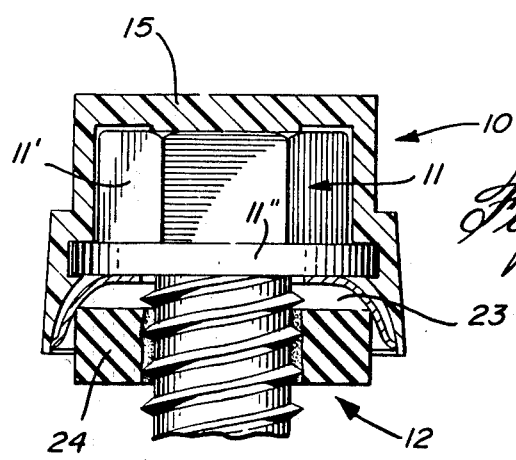
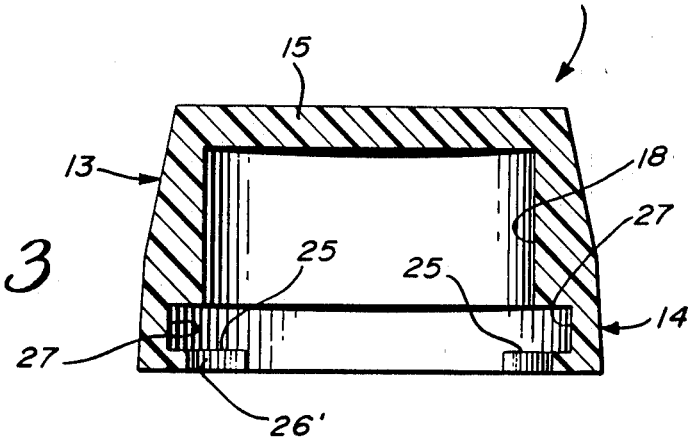

ATTACHMENT CAP FOR FASTENER HEAD

BACKGROUND OF THE INVENTION (a) Field of the Invention

The present invention relates to a cap for securement over the head of the fastener and wherein the cap is molded of synthetic resinous material and is adapted for snap-fit over the head.

(b) Description of the Prior Art

It is advantageous to cover the head of a fastener, such as a bolt or screw fastener, with a synthetic resinous cover whereby to prevent corrosion of the fastener or to cover the fastener with a colored cap whereby to conceal the fastener from its surrounding area, which may, for example, be the roof or side wall of a building structure made of colored or natural metal sheeting. Such caps have been provided and wherein the cap has a cavity configured to be press fitted onto the head of a fastener. The disadvantage of such covers is that they become undone from the fastener due to various reasons such as contraction and expansion of the cover material caused by environmental temperature changes. Also, such caps are often painted and are easily scratched when handled during installation.

It is also known in the prior art to mold synthetic resinous material about the head of a bolt such as, for example, described in British Pat. Nos. 953,009 and 991,961. The disadvantage of such covers is that the synthetic resinous material becomes damaged or soiled by fastening tools when the fastener is secured and such damage can cause the cover to fall off the fastener head, or else is aesthetically unpleasant. Another disadvantage of such synthetic material cover is that it is costly to fabricate and it is necessary to maintain a large inventory of fasteners as different types of fasteners are stocked and each type having covers of different colors. Such stock keeping is very expensive.

SUMMARY OF INVENTION

It is a feature of the present invention to provide a cap for securement over the head of a fastener and which substantially overcomes the above-mentioned disadvantages of the prior art.

Another feature of the present invention is to provide a cap for securement over the head of a fastener and wherein the cap is molded of synthetic resinous material and is provided with channel means for receiving in snap-fit engagement therein a lower circumferential flange of a fastener head to secure the cap over the fastener head.

Another feature of the present invention is to provide a cap for securement over the head of a fastener and wherein the cap is provided with an annular skirt whereby to also receive therein an annular dome-shaped cover located under the fastener head.

According to the above features, from a broad aspect, the present invention provides a cap for securement over the head of a fastener. The cap is molded of synthetic resinous material and has a hollow head portion and a cap attachment portion. The head portion has a top wall and an integral annular side wall. The attachment portion is formed integral with the inner wall adjacent a circumferential free edge of the side wall and is constituted by channel means for receiving in snap-fit engagement therein a lower circumferential flange of a fastener head to secure the cap over the fastener head.

BRIEF DESCRIPTION OF DRAWINGS

A preferred embodiment of the present invention will now be described with reference to the example thereof as illustrated in the accompanying drawings, in which:

FIG. 1 is a cross-section view of the cap of the present invention;

FIG. 2 is a cross-section view of the cap as shown in engagement over the head of a fastener having an annular dome-shaped washer cover with a washer located thereunder; and FIG. 3 is a cross-section view of the cap showing alternate examples of the cap construction.

DESCRIPTION OF PREFERRED EMBODIMENTS

Referring now to the drawings and more particularly to FIGS. 1 and 2, there is shown generally at 10 the cap of the present invention which is adapted to be secured over the head 11 of a fastener 12. The cap is molded of synthetic resinous material, such as polypropylene, and defines a hollow head portion 13 and a cap attachment portion 14. The head portion defines a top wall 15 and an integral annular side wall 16.

The cap attachment portion 14 is constituted by an annular channel 17 formed in the inner wall 18 of the cap adjacent the circumferential free edge 19 thereof (see FIG. 3). As shown in FIG. 1, a circumferential shoulder portion 20 is formed adjacent the lower circumferential free edge of the cap whereby to accommodate the circumferential channel 17 therein. Also, an annular skirt 21 is formed in the lower edge 19 and is provided with an inner concave surface 22 whereby to abut over an annular dome-shaped cover 23 located under the fastener head 11 and receiving therein a rubber washer 24 for compressing same between a surface (not shown) to which the fastener is secured to and the underside of the fastener head 11'. Also, as shown in FIG. 1, the annular skirt 21 is sufficiently long to cover the dome-shaped cover 23 and is thinner than the remaining portion of the cover whereby to be of greater flexibility to permit the shoulder portion 20 to flex outwardly to provide for the entry of the bolt head 11 therein and the circumferential flange 11" of the head.

The annular recess 17 is of substantially U-shape cross-section and defines a flat bottom wall 25 and opposed transverse side walls 25' and 25". The lower one 25" of the side walls terminates in a tapered end 26 which is formed by the concave undercut 22 whereby to constitute a flexible lip to permit snap-fit retention of the bolt head flange 11" therein. Thus, to install the cover on the fastener 11, it is simply necessary to push the cover over the bolt head with the fingers by applying pressure over the head causing the circumferential shoulder portion 20 to flex outwardly until the bolt head flange 11" is received in snap-fit engagement in the channel 17. Also, as seen in FIGS. 1 and 2, the circumferential shoulder portion 20 is outwardly sloped whereby to facilitate outward flexion thereof when the cap is positioned for securement over the fastener head.

Referring now to FIG. 3, there is shown alternate examples of the construction of the cap of this invention. It is firstly pointed out that the cap may be molded with any desirable outer cross-sectional shape. As is shown in FIGS. 1 and 2, the cap is of circular cross-section but may also be of hexagonal cross-section or have any other shape. Also, the cap may be molded of a colored synthetic plastic material. As herein shown, the circumferential free edge 19 of the cap does not have an annular skirt, such as 21 in FIGS. 1 and 2, formed therewith as it is not intended to cover a dome-shaped washer cover. The lip 26 formed in the lower edge 19 may either extend entirely about the circumference of the lower edge or may extend about small spaced-apart portions to constitute at least two channel portions 27 to grip under the flange 11″ of the bolt head 11′. Preferably, although not exclusively, the lower edge portion under the side wall 25″ is sloped such as at 26′ to define a tapered end 26 to facilitate entry of the bolt head flange 11″ by making the lip more resilient.

It is within the ambit of the present invention to cover any other obvious modifications of the cap of the present invention provided such modifications fall within the scope of the appended claims.

I claim:

1. A cap for securement over the head of a fastener, and wherein an annular dome-shaped cover is located under said fastener head to compress a flexible annular washer disposed about a fastener shank, said cap being molded of synthetic resinous material and having a hollow head portion and a cap attachment portion, said head portion having a top wall and an integral annular side wall, said attachment portion being formed integral with said annular side wall and disposed circumferentially below said side wall, said attachment portion having an annular channel in an inner wall thereof for receiving in snap-fit engagement therein a circumferential flange of a fastener head to secure said cap over the fastener head, a circumferential shoulder portion formed below said inner annular channel, and an outwardly flared annular tapering skirt depending from said shoulder portion, said skirt having a concave outwardly tapering inner wall and a straight sloped outer wall whereby said skirt is of decreasing thickness in a direction away from said shoulder portion to define a flexible lip, said skirt being of a length sufficiently long to receive thereunder said dome-shaped cover and flexible annular washer, said skirt being thinner in thickness than said head portion and more resilient for greater flexibility.

2. A cap as claimed in claim 1 wherein said annular channel is of substantially U-shape cross-section, said channel having a flat bottom wall and opposed transverse flat side walls, a lower one of said side walls terminating in a pointed end defined by a concave undercut whereby to form a flexible lip to permit snap-fit retention of said cap over a fastener head.

3. A cap as claimed in claim 1 wherein said circumferential shoulder portion defines an outwardly sloping circumferential wall to facilitate outward flexion thereof when said cap is positioned for securement over said fastener head.

4. A cap as claimed in claim 1 wherein said head portion is of circular cylindrical shape.

5. A cap as claimed in claim 1 wherein said synthetic resinous material has a color pigment therein.

* * * * *